United States Patent
Iwai et al.

(10) Patent No.: US 9,462,560 B2
(45) Date of Patent: Oct. 4, 2016

(54) WIRELESS COMMUNICATION TERMINAL DEVICE, WIRELESS COMMUNICATION BASE STATION DEVICE, AND WIRELESS COMMUNICATION METHOD

(75) Inventors: Takashi Iwai, Ishikawa (JP); Akihiko Nishio, Kanagawa (JP); Seigo Nakao, Kanagawa (JP); Masayuki Hoshino, Kanagawa (JP); Atsushi Sumasu, Kanagawa (JP); Masaru Fukuoka, Ishikawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 717 days.

(21) Appl. No.: 13/575,433

(22) PCT Filed: Feb. 9, 2011

(86) PCT No.: PCT/JP2011/000727
§ 371 (c)(1),
(2), (4) Date: Jul. 26, 2012

(87) PCT Pub. No.: WO2011/099283
PCT Pub. Date: Aug. 18, 2011

(65) Prior Publication Data
US 2012/0300740 A1 Nov. 29, 2012

(30) Foreign Application Priority Data
Feb. 10, 2010 (JP) ................. 2010-027958

(51) Int. Cl.
*H04L 5/00* (2006.01)
*H04W 52/32* (2009.01)
(Continued)

(52) U.S. Cl.
CPC ........... *H04W 52/325* (2013.01); *H04B 1/713* (2013.01); *H04J 13/0062* (2013.01); *H04L 5/0048* (2013.01); *H04L 25/0204* (2013.01); *H04L 25/0224* (2013.01)

(58) Field of Classification Search
CPC . H04L 5/0048; H04L 5/0051; H04L 5/0012; H04L 27/2613; H04L 25/0224; H04W 52/325; H04W 52/00; H04B 1/713; H04B 2201/70701; H04B 7/0602; H04B 7/0669; H04J 13/0062
USPC .................. 370/329; 375/132; 455/522
See application file for complete search history.

(56) References Cited

U.S. PATENT DOCUMENTS 6,738,646 B2 * 5/2004 Miyoshi et al. .............. 455/561
8,565,168 B2 * 10/2013 Papasakellariou et al. .. 370/329
(Continued)

OTHER PUBLICATIONS

R1-094707, Huawei, "Increasing SRS capacity to support UL MIMO" 3GPP TSG RAN WG1 meeting #59, Jeju, South Korea, Nov. 9-13, 2009.
(Continued)

*Primary Examiner* — Alpus H Hsu
*Assistant Examiner* — Elton Williams
(74) *Attorney, Agent, or Firm* — Pearne & Gordon LLP

(57) ABSTRACT

Disclosed are a wireless communication method, a wireless communication base station device, and a wireless communication terminal device that dynamically switch the transmission slot of an SRS of each terminal within a cell while suppressing an increase in the number of signaling bits. A terminal (100) and a base station (200) are each provided with a table wherein FH flags for SRS and transmission power data of each slot are mapped to two-bit notification bits. In this table, transmission power data indicating SRS transmission by slot 1 and slot 2 and FH flags are mapped, and an FH flag is not mapped to transmission power data indicating SRS transmission by slot 1 or slot 2. The base station (200) notifies the terminal (100) of the FH flag data and the SRS transmission power data by means of transmitting scheduling data containing the notification bits to the terminal (100).

6 Claims, 15 Drawing Sheets

| REPORTING BIT SEQUENCE (2bits) | FH FLAG | TRANSMISSION POWER INFORMATION SLOT 1, SLOT 2 | |
|---|---|---|---|
| | | NUMBER OF TRANSMISSION ANTENNAS=1 | NUMBER OF TRANSMISSION ANTENNAS=2 |
| 00 | WITH FH | Ant1(P, P) | Ant1(P, P) Ant2(P, P) |
| 01 | – | Ant1(P, 0) | Ant1(P, 0) Ant2(0, P) |
| 10 | – | Ant1(0, P) | Ant1(0, P) Ant2(P, 0) |
| 11 | WITHOUT FH | Ant1(P−ΔP, P−ΔP) | Ant1(P−ΔP, P−ΔP) Ant2(P−ΔP, P−ΔP) |

(51) Int. Cl.
*H04B 1/713* (2011.01)
*H04J 13/00* (2011.01)
*H04L 25/02* (2006.01)

(56) References Cited

U.S. PATENT DOCUMENTS

| | | | |
|---|---|---|---|
| 2008/0205333 A1* | 8/2008 | Budianu et al. | 370/329 |
| 2008/0273516 A1* | 11/2008 | Kim | H04J 13/0062 370/344 |
| 2009/0232036 A1* | 9/2009 | Marx | 370/311 |
| 2014/0036859 A1* | 2/2014 | Ekpenyong et al. | 370/330 |

OTHER PUBLICATIONS

R1-100745, 3GPP TSG RAN WG1 #59bis, Valencia, Spain, Jan. 18-22, 2010, Texas Instruments, "Increasing Sounding Capacity for LTE-A".

International Search Report for PCT/JP2011/000727 dated Mar. 22, 2011.

* cited by examiner

| FIELD | NUMBER OF BITS |
|---|---|
| FORMAT | 1 |
| RB ASSIGNMENT | $\lceil \log_2(N_{RB}(N_{RB}+1)/2) \rceil$ |
| HOPPING FLAG | 1 |
| CRC | 16 |
| MCS + RV | 5 |
| NDI | 1 |
| CQI REQUEST | 1 |
| PUSCH TPC | 2 |
| CYCLIC SHIFT FOR DMRS | 3 |

※ $N_{RB}$ DENOTES SYSTEM BANDWIDTH

FIG.1
PRIOR ART

| REPORTING BIT SEQUENCE (2bits) | FH FLAG | TRANSMISSION POWER INFORMATION SLOT 1, SLOT 2 |
|---|---|---|
| 00 | WITH FH | P, P |
| 01 | — | P, 0 |
| 10 | — | 0, P |
| 11 | WITHOUT FH | P, P |

FIG.6

| REPORTING BIT SEQUENCE (2bits) | FH FLAG | TRANSMISSION POWER INFORMATION SLOT 1, SLOT 2 |
|---|---|---|
| 00 | WITH FH | P, P |
| 01 | — | P, 0 |
| 10 | — | 0, P |
| 11 | WITHOUT FH | P−ΔP, P−ΔP |

FIG.8

| REPORTING BIT SEQUENCE (2bits) | FH FLAG | TRANSMISSION POWER INFORMATION SLOT 1, SLOT 2 | |
|---|---|---|---|
| | | NUMBER OF TRANSMISSION ANTENNAS=1 | NUMBER OF TRANSMISSION ANTENNAS=2 |
| 00 | WITH FH | Ant1(P, P) | Ant1(P, P) Ant2(P, P) |
| 01 | — | Ant1(P, 0) | Ant1(P, 0) Ant2(0, P) |
| 10 | — | Ant1(0, P) | Ant1(0, P) Ant2(P, 0) |
| 11 | WITHOUT FH | Ant1(P, P) | Ant1(P, P) Ant2(P, P) |

FIG.11

| REPORTING BIT SEQUENCE (2bits) | FH FLAG | TRANSMISSION POWER INFORMATION SLOT 1, SLOT 2 | |
|---|---|---|---|
| | | NUMBER OF TRANSMISSION ANTENNAS=1 | NUMBER OF TRANSMISSION ANTENNAS=2 |
| 00 | WITH FH | Ant1(P, P) | Ant1(P, P)<br>Ant2(P, P) |
| 01 | — | Ant1(P, 0) | Ant1(P, 0)<br>Ant2(0, P) |
| 10 | — | Ant1(0, P) | Ant1(0, P)<br>Ant2(P, 0) |
| 11 | WITHOUT FH | Ant1(P−ΔP, P−ΔP) | Ant1(P−ΔP, P−ΔP)<br>Ant2(P−ΔP, P−ΔP) |

FIG.12

WIRELESS COMMUNICATION TERMINAL DEVICE, WIRELESS COMMUNICATION BASE STATION DEVICE, AND WIRELESS COMMUNICATION METHOD

TECHNICAL FIELD

The present invention relates to a radio communication terminal apparatus, a radio communication base station apparatus, and a radio communication method which transmit and receive reference signals.

BACKGROUND ART

In an uplink for LTE-Advanced, which is a developed version of 3GPP LTE (3rd Generation Partnership Project Long Term Evolution), support for transmission by a terminal using multiple antennas (SU-MIMO: single user-multiple input multiple output) is being studied. The SU-MIMO is a technique in which one terminal transmits data signal of the same frequency at the same time from multiple antenna ports and spatial-multiplexes data signals using a virtual communication path (stream) in space.

In order to improve communication performance by SU-MIMO, a base station must know the status of a propagation path (channel) from each antenna of a terminal using a sounding reference signal, one of the reference signals (hereinafter referred to as "sounding reference signal (SRS)"). Thus, the terminal must transmit an SRS from each antenna. "Sounding" refers to estimation of the quality of a propagation path between a terminal and a base station.

The SRS in the LTE is time-multiplexed with data, i.e. the symbol at the tail end of a subframe and transmitted to estimate the channel quality of an uplink data channel.

In LTE, because a terminal has one transmission antenna, the terminal transmits one SRS from the antenna. On the other hand, in LTE-Advanced, because a terminal has N antennas, overhead for SRS transmission may increase to N times, causing shortage of domains for SRS.

In order to increase the number of SRSs that can be transmitted in a cell every unit time, i.e. enhance the SRS capacity, a known method uses a code resource for reference signals for data demodulation (hereinafter referred to as "demodulation reference signal (DMRS)") (see NPL 1).

NPL 1 discloses a base station that uses scheduling information for uplink (also referred to as an UL grant) to instruct a terminal to transmit SRS. An SRS for which transmission is prompted by scheduling information transmitted from a base station is called "scheduled SRS". FIG. 1 shows information reported by an UL grant that gives an instruction on transmission of a data signal in LTE. The UL grant contains predetermined numbers of bits, each indicating a piece of information such as a frequency hopping flag (FH flag) that indicates the presence or absence of frequency hopping between slots and the amount of cyclic shift for DMRS (hereinafter referred to as "amount of CS (cyclic shift for DMRS)").

Upon receiving the instruction on SRS transmission contained in an UL grant from a base station, a terminal transmits an SRS using the single carrier-frequency division multiple access (SC-FDMA) symbol in the physical uplink shared channel (PUSCH) in which a DMRS is to be assigned. A DMRS is transmitted using the symbol at the center in each slot of one subframe, as shown in FIG. 2, the subframe being consisting of two slots and being a scheduling unit of data signal. A DMRS and an SRS are signals using a cyclic shift sequence having the same sequence (ZC (Zadoff-Chu) sequence) cyclic-shifted. Hence, an SRS can be code-multiplexed in the same band as a DMRS using the amount of CS that is different from that for DMRS.

In the LTE specification, an SRS is transmitted using only the symbol at the tail end of one subframe. NPL 1 discloses transmission of SRS using the symbol at the center of a slot (position of the symbol for DMRS) in addition to the symbol at the tail end of one subframe, thus enhancing the SRS capacity.

Here, the FH flag contained in the UL grant for DMRS can also be applied to the scheduled SRS. That is, in the case where the Fit flag indicates that FH will be performed ("with FH"), there is an advantage that the channel quality can be measured for a plurality of bands because SRSs can be transmitted in two bands of slots 1 and 2. On the other hand, in the case where the FH flag indicates that FH will not be performed ("without FH"), there is an advantage that SRSs can be equalized in the same band of slot 1 and slot 2 and an influence of interference can be reduced (randomized). Furthermore, multiplication of the Walsh sequence with SRSs in the same band of slot 1 and slot 2 has another advantage in that an SRS can be multiplexed with DMRS in a different bandwidth.

CITATION LIST

Non-Patent Literature

NPL 1
R1-094707, Huawei, "Increasing SRS capacity to support UL MIMO"

SUMMARY OF INVENTION

Technical Problem

As described above, in the case of "with FH" or "without FH," one terminal may transmit SRSs using slot 1 and slot 2. Furthermore, one terminal may transmit an SRS using either of slot 1 or slot 2 because transmission of an SRS by one terminal using only one slot has an advantage of reduced consumption of resources for SRS transmission for every terminal. That is, allocation of different terminals to different slots including an SRS to be transmitted to multiplex the slots in one subframe as shown in FIG. 3 allows the number of terminals that can transmit SRSs in every unit time to be increased.

However, in order that a base station dynamically switch slots including an SRS to be transmitted (SRS transmission slots) for every terminal in a cell, information about SRS transmission slot must be added to an UL grant. This leads to an unfavorable increase in the size of the UL grant (the number of signaling bits). In other words, two bits must be added to the UL grant so that a base station gives an instruction on one terminal to perform the following three patterns as transmission slot information: "transmission using only slot 1," "transmission using only slot 2," and "transmission using slot 1 and slot 2." This requires two more bits for the transmission slot information, in addition to one bit for the above FH flag.

It is an object of the present invention to provide a radio communication terminal apparatus, a radio communication base station apparatus, and a radio communication methods that can dynamically switch SRS transmission slots for every terminal in a cell without an increase in the number of required signaling bits.

Solution to Problem

A terminal apparatus according to the present invention includes: a reference signal transmission control section that stores first reporting information associated with first transmission slot information and a frequency hopping flag, and second reporting information associated with second transmission slot information, the first transmission slot information indicating transmission of a sounding reference signal using all slots in a single subframe, the frequency hopping flag indicating whether or not to perform frequency hopping between slots, and the second transmission slot information indicating transmission of the sounding reference signal using only a single slot in the single subframe; a reception section that receives the first reporting information and second reporting information; a mapping section that maps the sounding reference signal based on the frequency hopping flag and the first transmission slot information and second transmission slot information that correspond to the received first reporting information and second reporting information, respectively; and a transmission section that transmits the mapped sounding reference signal.

A base station apparatus according to the present invention includes: a reference signal transmission control section that stores first reporting information associated with first transmission slot information and a frequency hopping flag and second reporting information associated with second transmission slot information, the first transmission slot information indicating transmission of a sounding reference signal using all slots in a single subframe, the frequency hopping flag indicating whether or not to perform frequency hopping between slots, and the second transmission slot information indicating transmission of the sounding reference signal using only a single slot in a single subframe; and an extraction section that extracts the sounding reference signal contained in a reception signal received from a terminal apparatus based on the frequency hopping flag and the first transmission slot information and second transmission slot information that correspond to the first reporting information and second reporting information, respectively.

A radio communication method according to the present invention includes: storing first reporting information associated with first transmission slot information and a frequency hopping flag and second reporting information associated with second transmission slot information, the first transmission slot information indicating transmission of a sounding reference signal using all slots in a single subframe, the frequency hopping flag indicating whether or not to perform frequency hopping between slots, and the second transmission slot information indicating transmission of the sounding reference signal using only a single slot in the single subframe; receiving the first reporting information and second reporting information from a base station apparatus by a terminal apparatus; and transmitting to the base station apparatus by a terminal apparatus the sounding reference signal based on the frequency hopping flag and the first transmission slot information and second transmission slot information that correspond to the received first reporting information and second reporting information, respectively.

A radio communication method according to the present invention includes: storing apparatus first reporting information associated with first transmission slot information and a frequency hopping flag and second reporting information associated with second transmission slot information, the first transmission slot information indicating transmission of a sounding reference signal using all slots in a single subframe, the frequency hopping flag indicating whether or not to perform frequency hopping between slots, and the second transmission slot information indicating transmission of the sounding reference signal using only a single slot in a single subframe; and extracting by the base station apparatus the sounding reference signal contained in a reception signal received from the terminal apparatus based on the frequency hopping flag and the first transmission slot information and second transmission slot information that correspond to the first reporting information and second reporting information, respectively.

Advantageous Effects of Invention

According to the present invention, SRS transmission slots can be dynamically switched for every terminal in a cell without an increase in the number of required signaling bits.

BRIEF DESCRIPTION OF DRAWINGS

FIG. 1 shows information reported using an UL grant to give an instruction on transmission of a data signal in LTE;

FIG. 6 shows a condition where an FH flag for SRS and transmission power information for each slot are associated with reporting bit sequences according to Embodiment 1 of the present invention;

FIG. 8 shows another condition where an FH flag for SRS and transmission power information for each slot are associated with reporting bit sequences according to Embodiment 1 of the present invention;

FIG. 11 shows a condition where an FH flag for SRS and transmission power information for each slot are associated with reporting bit sequences according to Embodiment 2 of the present invention;

FIG. 12 shows another condition where an FH flag for SRS and transmission power information for each slot are associated with reporting bit sequences according to Embodiment 2 of the present invention;

DESCRIPTION OF EMBODIMENTS

Figure 2:
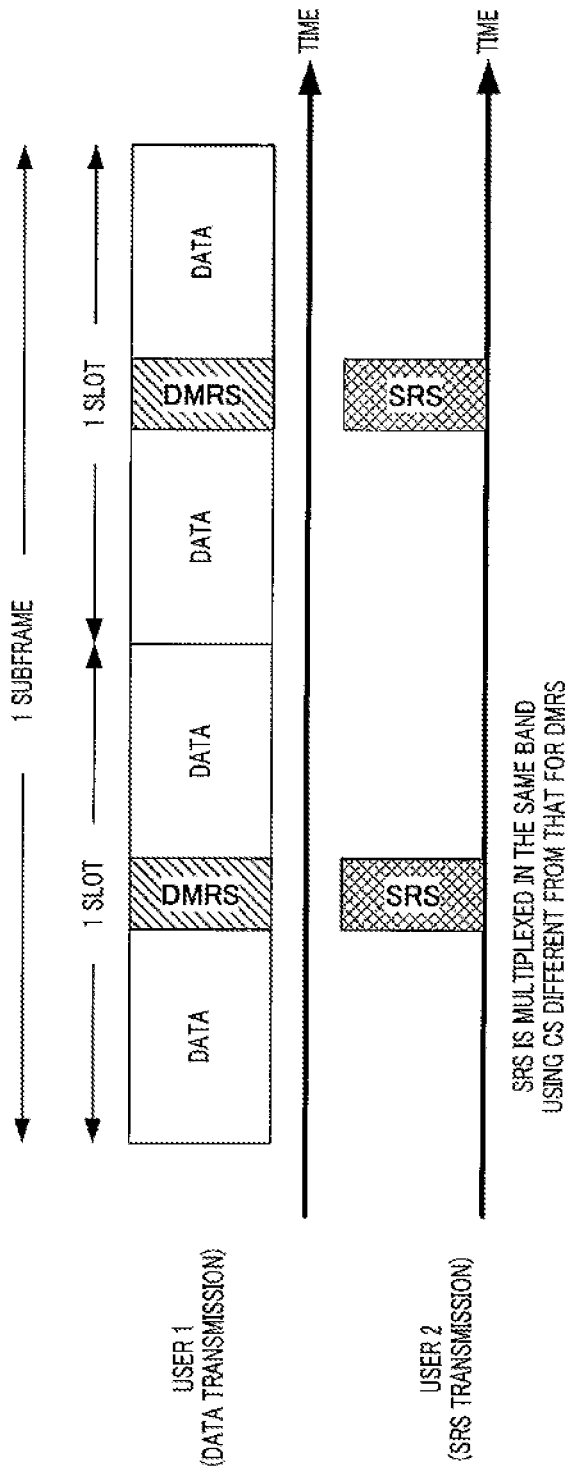
FIG. 2 shows a condition where DMRSs and SRSs are assigned in the symbols at the center of slots.
Figure 3:
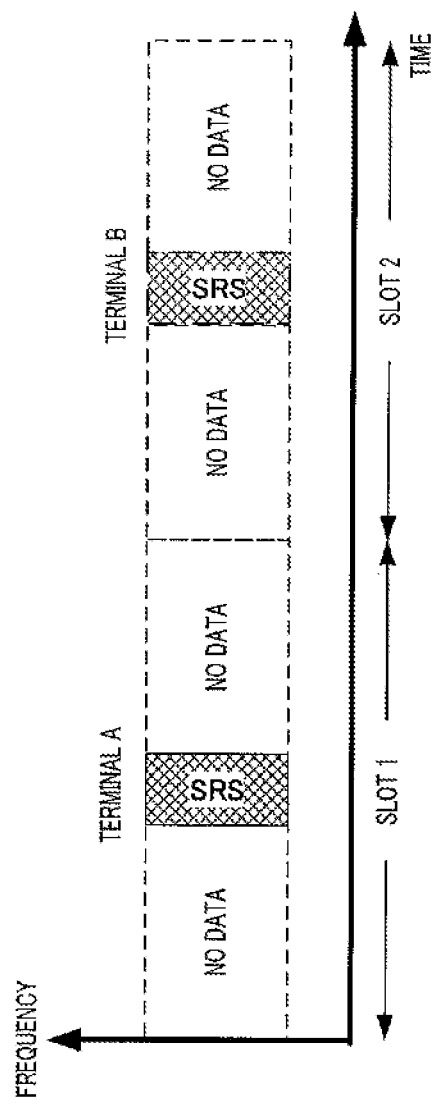
FIG. 3 shows that slots including an SRS to be transmitted are multiplexed in one subframe, the slots being allocated to different terminals.

Embodiments of the present invention will now be described in detail with reference to the accompanying drawings. In the embodiments, the same parts will be assigned the same reference numerals without overlapping explanation.

Embodiment 1

Figure 4:
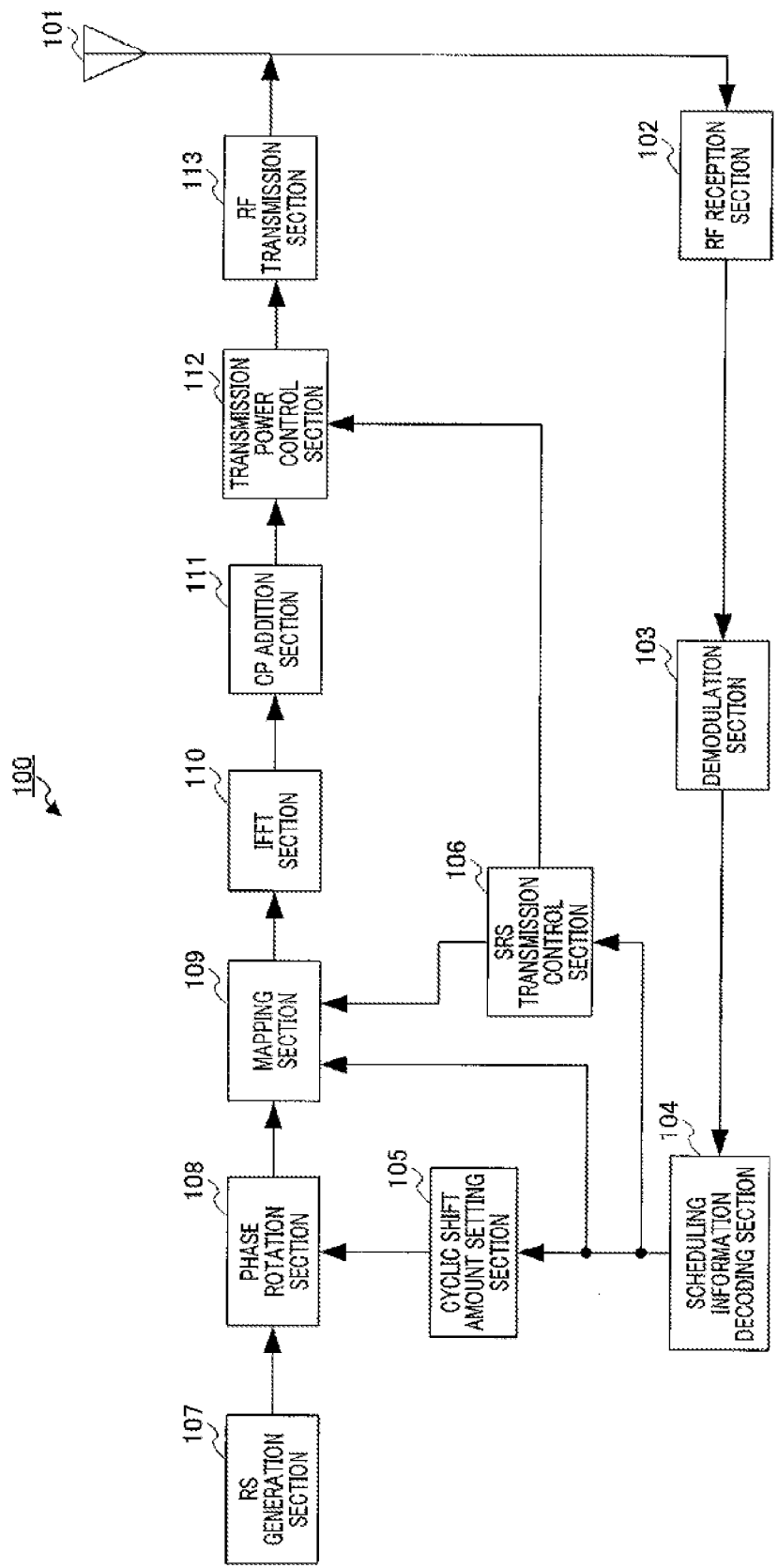
FIG. 4 is a block diagram of a configuration of a radio communication terminal apparatus according to Embodiment 1 of the present invention.

FIG. 4 shows a block diagram of a configuration of radio communication terminal apparatus (hereinafter referred to as "terminal") 100 according to Embodiment 1 of the present invention. Hereinafter, the configuration of the terminal will be described with reference to FIG. 4.

RF reception section 102 receives a signal transmitted from a radio communication base station apparatus (hereinafter referred to as "base station") via antenna 101, performs reception processes such as down-conversion and A/D conversion on the reception signal, and outputs the reception signal to demodulation section 103. Demodulation section 103 demodulates scheduling information for uplink (UL grant) contained in the reception signal output from RF reception section 102, and outputs the demodulated scheduling information to scheduling information decoding section 104.

Scheduling information decoding section 104 decodes the scheduling information received from demodulation section 103, and outputs the decoded scheduling information to cyclic shift amount setting section 105, SRS transmission control section 106, and mapping section 109. The scheduling information includes, for example, frequency hopping flag to be performed between slots, reporting information about the CS amount for a reference signal (cyclic shift for DMRS), frequency resource assignment information (RB assignment), data size (MCS+RV), power control information (PUSCH TPC), as shown in FIG. 1.

Cyclic shift amount setting section 105 acquires the amount of cyclic shift of a sequence for reference signal (RS) from the reporting information about the CS amount for RS contained in the scheduling information from scheduling information decoding section 104, and outputs the acquired amount of cyclic shift to phase rotation section 108.

SRS transmission control section 106 acquires a reporting bit sequence contained in scheduling information from scheduling information decoding section 104 and finds an FH flag for SRS and SRS transmission power information for each slot (corresponding to information about an SRS transmission slot) that are associated with the reporting bit sequence in advance. SRS transmission control section 106 outputs the found FH flag to mapping section 109, and outputs the found SRS transmission power information for each slot (specifically, any information of "transmission using only slot 1," "transmission using only slot 2," "transmission using slot 1 and slot 2") to transmission power control section 112. SRS transmission control section 106 will be described in detail later.

RS generation section 107 generates a sequence for RS (e.g. Zadoff-Chu (ZC) sequence) and outputs the generated sequence for RS to phase rotation section 108.

Phase rotation section 108 performs phase rotation on samples of the sequence for RS from RS generation section 107 based on the amount of cyclic shift from cyclic shift amount setting section 105, and outputs the sequence for RS that has undergone the phase rotation to mapping section 109, the phase rotation corresponding to the amount of cyclic shift in the time domain. Since the samples of the sequence for RS are assigned to subcarriers, the sequence for RS is a frequency domain signal. The phase rotation process in the frequency domain is equivalent to a cyclic shift process in the time domain.

Mapping section 109 maps the sequence for RS output from phase rotation section 108 to frequency resources in each slot based on frequency resource assignment information contained in the scheduling information output from scheduling information decoding section 104 and the FH flag output from SRS transmission control section 106. Specifically, in the case where the FH flag indicates "without FH," mapping section 109 maps the sequence for RS in a frequency band (frequency resources) of slot 1 and slot 2 that is indicated by frequency resource assignment information. On the other hand, in the case where the FH flag indicates "with FH," mapping section 109 maps the sequence for RS in a frequency band of slot 1 indicated by frequency resource assignment information and maps the sequence for RS in a frequency band determined by adding the amount of frequency resource hopping to a frequency band of slot 2 indicated in the frequency resource assignment information, the amount of frequency resource hopping being defined in advance by the system. Mapping section 109 outputs the signal having the sequence for RS mapped in the frequency band to inverse fast Fourier transform (IFFT) section 110.

IFFT section 110 performs the IFFT process on the signal output from mapping section 109 and outputs the signal that has undergone IFFT to cyclic prefix (CP) addition section 111. CP addition section 111 adds a signal that is identical to the tail end of the signal output from IFFT section 110 to the heading of the signal that has undergone IFFT as a CP and outputs the signal having the CP to transmission power control section 112.

Transmission power control section 112 determines transmission power for the signal output from CP addition section 111 according to the SRS transmission power information for each slot output from SRS transmission control section 106 and outputs to RF transmission section 113 the signal corresponding to the determined transmission power. Specifically, transmission power control section 112 allocates a predetermined transmission power P to a slot including an SRS to be transmitted and allocates transmission power of 0 to a slot not including an SRS to be transmitted, where the predetermined transmission power P has been reported in advance from a base station.

RF transmission section 113 performs transmission processes such as D/A conversion, up-conversion, and amplification on the signal output from transmission power control section 112 and transmits the transmission-processed signal as an SRS from antenna 101.

Figure 5:
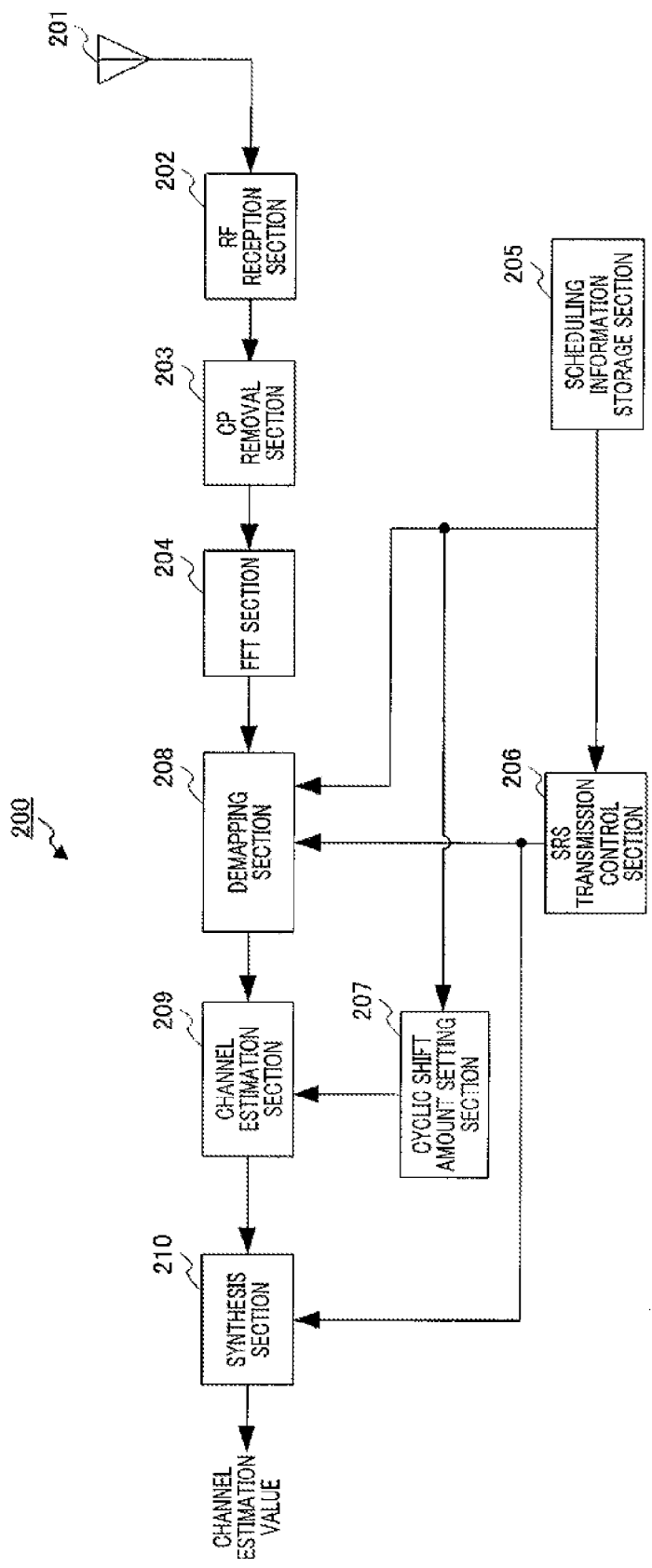
FIG. 5 is a block diagram of a configuration of a radio communication base station apparatus according to Embodiment 1 of the present invention.

FIG. 5 is a block diagram of a configuration of radio communication base station apparatus (hereinafter referred to as "base station") 200 according to Embodiment 1 of the present invention. Hereinafter, the configuration of base station 200 will be described with reference to FIG. 5.

RF reception section 202 performs reception processes such as down-conversion and A/D conversion on the signal received from antenna 201 and outputs the reception signal that has undergone the reception process to CP removal section 203. CP removal section 203 removes the CP added to the heading of the reception signal output from RF reception section 202 and outputs the reception signal without the CP to fast Fourier transform (FFT) section 204.

FFT section 204 performs the FFT process on the reception signal output from CP removal section 203 to convert the signal into a frequency domain signal and outputs the frequency domain signal to demapping section 208.

Scheduling information storage section 205 stores the scheduling information for uplink that has been reported to terminal 100 and outputs scheduling information received from a desired terminal to SRS transmission control section 206, cyclic shift amount setting section 207, and demapping section 208.

SRS transmission control section 206 acquires a reporting bit sequence that has been transmitted from scheduling information storage section 205 to the desired terminal and finds the FH flag and the SRS transmission power information for each slot (corresponding to the information about SRS transmission slot) that have been associated in advance with the transmitted reporting bit sequence. SRS transmission control section 206 outputs information about the found FH flag to demapping section 208 and outputs the information about the found FH flag and SRS transmission power information to synthesis section 210.

Cyclic shift amount setting section 207 acquires the amount of cyclic shift for the desired terminal from reporting information about the CS amount for reference signal contained in the scheduling information output from scheduling information storage section 205, and outputs the acquired amount of cyclic shift to channel estimation section 209.

Demapping section 208 extracts SRS signals corresponding to the transmission band(s) of slot 1 and slot 2 for the desired terminal from the frequency domain signal output from FFT section 204, based on the frequency resource assignment information of the desired terminal that is contained in the scheduling information output from scheduling information storage section 205 and the FH flag information that is output from SRS transmission control section 206, and outputs the SRS signals extracted from slot 1 and slot 2 to channel estimation section 209. Demapping section 208 functions as an extraction means.

Channel estimation section 209 performs complex division on the sequence for RS known by both the transmitting and receiving sides using the SRS signal output from demapping section 208 in slot 1 and slot 2 to determine a correlation signal in the frequency domain. Channel estimation section 209 performs the IDFT process on the correlation signal in the frequency domain to calculate the correlation signal in the time domain (delay profile). This delay profile contains SRS signals (reference signals) of multiple terminals. Channel estimation section 209 extracts channel estimation value(s) of the desired terminal through masking of correlation signals in the calculated delay profile other than the correlation signal corresponding to the amount of cyclic shift of the desired terminal (time domain containing the signal of the terminal) using the amount of cyclic shift of the desired terminal output from cyclic shift amount setting section 207. Channel estimation section 209 outputs the channel estimation values of the desired terminal that are extracted from slot 1 and slot 2 to synthesis section 210.

Synthesis section 210 combines the channel estimation values of slot 1 and slot 2 that are received from channel estimation section 209, based on FH flag information and SRS transmission power information that are received from SRS transmission control section 206. In the case where the FH flag information indicates "without FH" and SRSs are transmitted using slot 1 and slot 2, synthesis section 210 combines the channel estimation values of slot 1 and slot 2. Specifically, synthesis section 210 switches power synthesis and in-phase synthesis according to the difference in the scale of expected channel variations between slot 1 and slot 2. That is, at large channel variations, synthesis section 210 performs power synthesis to randomize the influence of interference. At small channel variations, synthesis section 210 performs in-phase synthesis to improve the reception SNR (estimation performance of reception SNR). In the case where the FH flag information indicates "with FH", SRS transmission bands that are remote from each other have different channel qualities; hence synthesis section 210 does not combine channel estimation values of slot 1 and slot 2. That is, synthesis section 210 outputs the two channel estimation values (channel estimation values in the two SRS transmission bands of slot 1 and slot 2) as is. Furthermore, in the case where there is a slot not including an SRS to be transmitted, synthesis section 210 does not combine channel estimation values of slot 1 and slot 2.

An operation of SRS transmission control section 106 of the above-described terminal 100 will now be described. Since SRS transmission control section 206 of base station 200 performs the same operation as SRS transmission control section 106, the explanation of SRS transmission control section 206 will not be provided.

SRS transmission control section 106 includes a table in which an FH flag for SRS and SRS transmission power information for each slot are associated with a reporting bit sequence represented by two bits, as shown in FIG. 6. SRS transmission control section 106 acquires from the table FH flag information and SRS transmission power information corresponding to the reporting bit sequence contained in the scheduling information output from scheduling information decoding section 104.

Here, symbol P in FIG. 6 denotes predetermined transmission power reported in advance from a base station, and is determined, for example, by Equation 1 below representing SRS transmission power, which is used in LTE.

$$P=P_{offset}+P_0+10\cdot\log(M)+\alpha\cdot PL+f \qquad \text{(Equation 1)}$$

In Equation 1, symbols $P_{offset}$, $P_0$, and $\alpha$ denote parameters to be reported from a base station to a terminal; symbol M denotes the number of frequency resource blocks to be assigned; symbol FL denotes a path loss level measured by the terminal. Symbol f denotes a transmission power control value subject to closed-loop control, the value being a cumulative value containing past transmission power control values.

As shown in FIG. 6, in the case where SRSs are transmitted using all slots (slot 1 and slot 2 in the present embodiment) in a subframe, an FH flag is associated with the reporting bit sequence (the FH flag is set to "with FH" or "without FH"), and in the case where an SRS is transmitted using only one slot (slot 1 or slot 2) in a subframe, an FH flag is not associated with the reporting bit sequence (the FH flag is set to "–" or "NULL," for example). This association of an FH flag with a reporting bit sequence is carried out for every system or every base station and is shared by the base station and terminals.

Figure 7A:
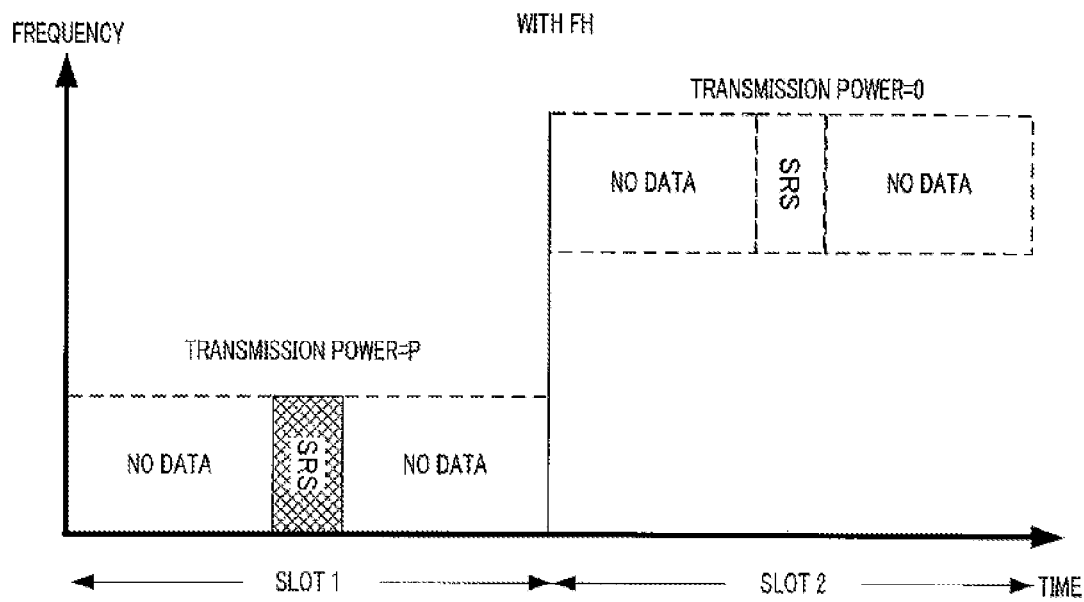
FIG. 7A shows transmission of an SRS using only one slot in a subframe when FH is performed.
Figure 7B:
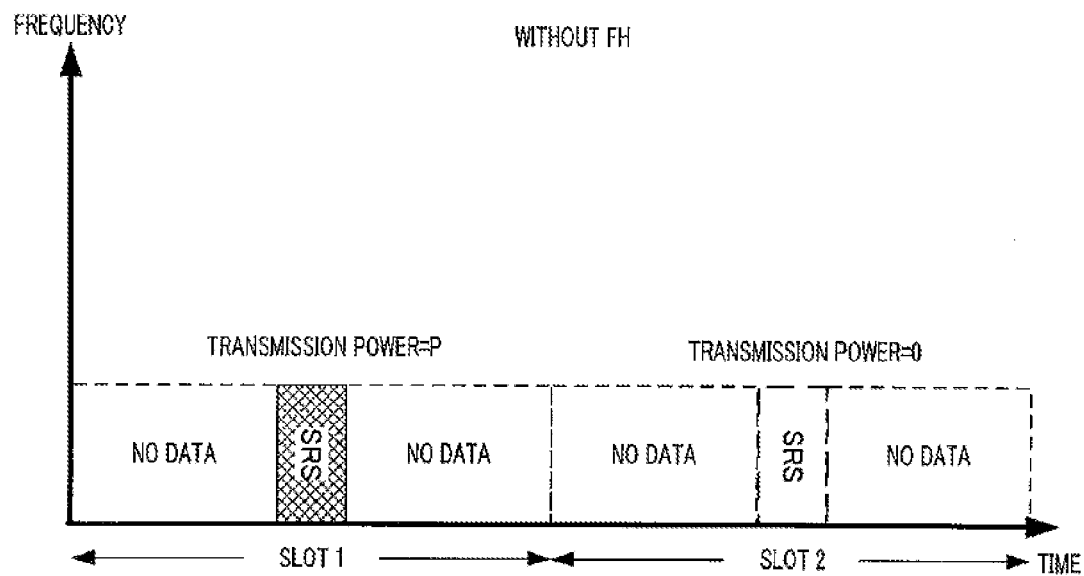
FIG. 7B shows transmission of an SRS using only one slot in a subframe when FH is not performed.

The reason why an FH flag is not associated with a reporting bit sequence in the transmission of the SRS using only one slot (slot 1 or slot 2) in a subframe as described above is as follows: Both in the case of "with FH" (FIG. 7A) and the case of "without FH" (FIG. 7B), the SRS is transmitted using only one slot while not being transmitted using the other slot; thus, the concept of frequency hopping itself does not work as shown in FIG. 7.

By this means, the reporting bit sequence is two bits, reducing the number of bits required for the reporting bit sequence by one compared to the case where an FH flag (one bit) and transmission slot information (two bits) are reported independently.

The SRS transmission power will now be described. In particular, the SRS transmission power when SRSs are transmitted using slot 1 and slot 2 "without FH" will be described. In this case, a terminal may generate too large transmission power for a base station to estimate the channel quality in one band at a required precision.

Estimation, at a receiving side (base station), of the channel quality (estimation of reception SNR) by in-phase synthesis on SRSs in slot 1 and slot 2 can reduce noise components. This can improve the reception SNR by up to 3 dB, compared to the reception SNR measured using the SRS in one slot only. For this reason, even when the terminal reduces transmission power by an amount corresponding to the improved reception SNR, the base station can estimate the channel quality at a required precision. Hence, in the case where SRSs are transmitted using slot 1 and slot 2 "without FH," the transmission of the SRSs with the transmission power substantially the same as that for other cases leads to excess transmission power, wasting power consumption at the terminal.

Here, the amount of improved SNR acquired by performing in-phase synthesis on the SRSs in slot 1 and slot 2 depends on the scale of channel variations (moving speed) of a terminal. At a low moving speed of the terminal, the difference in channel variations between slot 1 and slot 2 are small and slot 1 and slot 2 have substantially the same channel quality, so that it is possible to expect the effect that in-phase synthesis of SRSs in slot 1 and slot 2 improves the SNR by about 3 dB. At a high moving speed of the terminal, the difference in channel variations between slot 1 and slot 2 are large and slot 1 and slot 2 have different channel qualities, so that it is not possible to expect the effect of improvement of the SNR by in-phase synthesis of SRSs in slot 1 and slot 2. In this case, the influence of noise may be randomized (equalized) by performing power synthesis.

Hence, in the case where SRSs are transmitted using slot 1 and slot 2 "without FH," if the terminal always reduces the SRS transmission power by 3 dB, the channel estimation precision decreases at the receiving side (base station), at which an effect by virtue of in-phase addition of SRSs in slot 1 and slot 2 cannot be achieved.

To overcome the above problem during transmission of SRSs using slot 1 and slot 2 "without FH," the terminal reduces the SRS transmission power by an amount corresponding to variable ΔP (parameter set in advance by a base station to the terminal). That is, the base station (receiving side) notices terminals of the amount ΔP of improved SNR that is acquired by performing in-phase synthesis on SRSs in slot 1 and slot 2, to allow the terminals to transmit SRSs with appropriate transmission power. For example, ΔP=0 is set for terminals having large channel variations (high-speed moving terminal) and ΔP=3 dB is set for terminals other than the high-speed moving terminals (low-speed moving terminal). ΔP may be set not only for every terminal, but also for every cell (for all terminals in a cell). Furthermore, ΔP may be set for every cell depending on the location of a base station (whether the base station is located in a place with many high-speed moving terminals or a place with many low-speed moving terminals).

In this case, SRS transmission control section 106 acquires FH flag information and SRS transmission power information using the reporting bit sequence represented by two bits which associates the FH flag for SRS with SRS transmission power information for each slot, as shown in FIG. 8. Only when SRSs are transmitted using slot 1 and slot 2 "without FH," SRS transmission control section 106 determines the SRS transmission power by taking ΔP into consideration, as shown in Equation 2.

$$P=P_{\mathit{offset}}+P_0+10\cdot\log(M)+\alpha\cdot PL+f-\Delta P \quad \text{(Equation 2)}$$

In this way, according to Embodiment 1, association of the FH flag for SRS and SRS transmission power information for each slot with the reporting bit sequence represented by two bits can give an instruction on SRS transmission using only one slot and dynamically switch the SRS transmission slots for each terminal in a cell without an increase in the number of required signaling bits.

Furthermore, transmission of SRSs using all slots in a subframe "without FH" can reduce the SRS transmission power by the amount of variable ΔP (predetermined parameter set by a base station) and thus can reduce the power consumption of the terminal.

Substitution of the conventional UL grant for PUSCH (DMRS) for the UL grant for SRS requires information for determining the transmission mode, i.e. SRS transmission or PUSCH (DMRS) transmission. For this purpose, for example, the parameter "MCS+RV" in FIG. 1, which indicates data size, may be used. Setting data size to 0 in this parameter can give an instruction on the SRS transmission, while setting the data size to a value other than 0 can give an instruction on the PUSCH (DMRS) transmission.

Furthermore, an FH flag and SRS transmission power information (information about SRS transmission slot) shown in the embodiments may be reported using information contained in the conventional UL grant for PUSCH (DMRS) that is not required for the SRS transmission, such as the new data indicator (NDI: a flag indicating the initial packet or a retransmitted packet) in FIG. 1. That is, for the SRS transmission, substitution of an FH flag (one bit) and NDI (one bit) shown in FIG. 6 or 8 for the reporting bit sequence represented by two bits allows the conventional UL grant for a PUSCH to be substituted for the UL grant for SRS.

Embodiment 2

Figure 9:
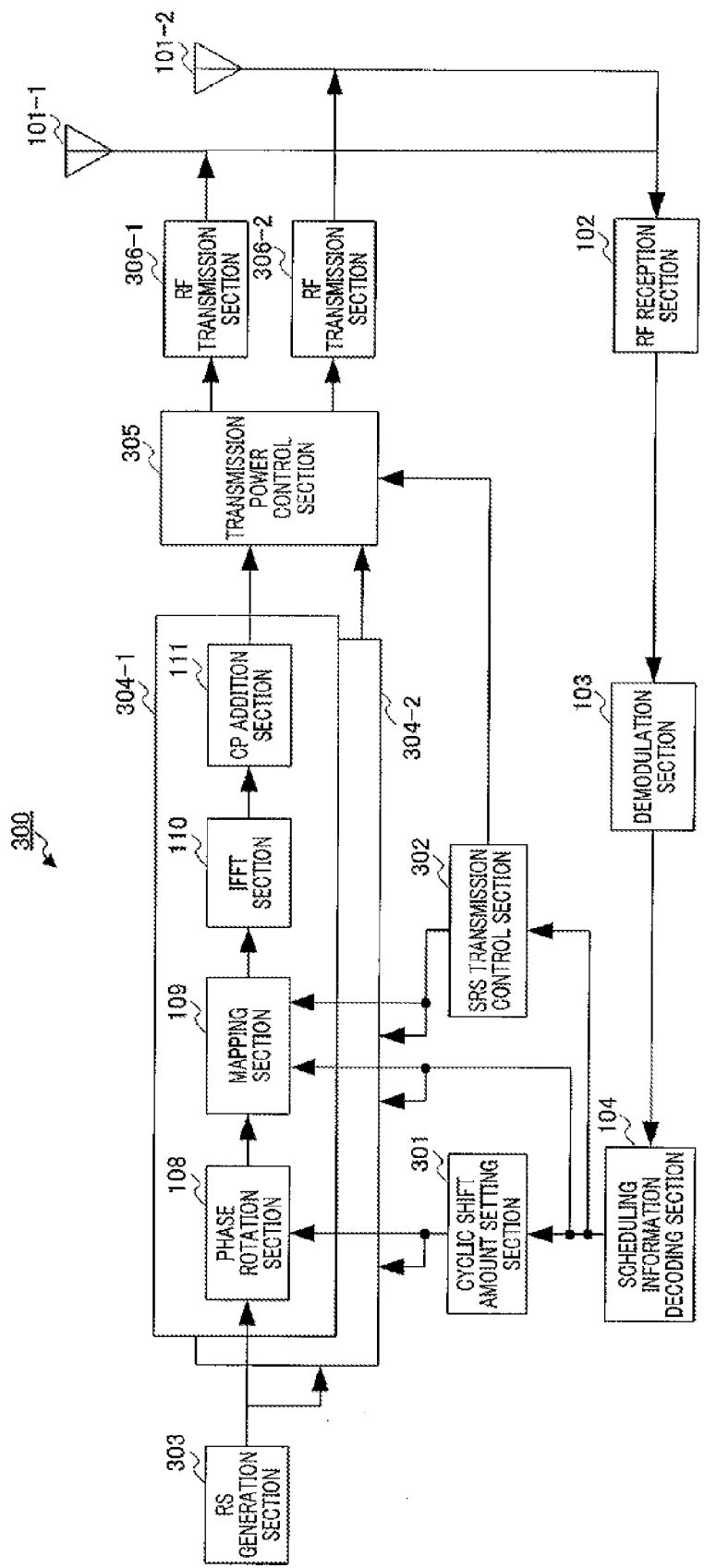
FIG. 9 is a block diagram of a configuration of a terminal according to Embodiments 2 and 3 of the present invention.

FIG. 9 is a block diagram of a configuration of terminal 300 according to Embodiment 2 of the present invention. The terminal in FIG. 9 is different from the terminal in FIG. 4 in that one antenna and a transmission process for the additional antenna are further provided. Hereinafter, the configuration having different functions from that of Embodiment 1 will be described.

Cyclic shift amount setting section 301 acquires the amount of cyclic shift of a sequence for RS from reporting information about the CS amount for a reference signal for each antenna that is contained in the scheduling information output from scheduling information decoding section 104, and outputs the acquired amount of cyclic shift to phase rotation sections 108 in transmission process sections 304-1 and 304-2.

SRS transmission control section 302 acquires information containing an FH flag for SRS and SRS transmission power information for each slot (corresponding to SRS transmission slot information) for each antenna that is contained in scheduling information from scheduling information decoding section 104. SRS transmission control section 302 outputs the acquired FH flag to mapping sections 109 in transmission process sections 304-1 and 304-2 and outputs the acquired SRS transmission power information for each slot to transmission power control sections 305 in transmission process sections 304-1 and 304-2. SRS transmission control section 302 will be described later in detail.

RS generation section 303 generates a sequence for RS (e.g. ZC sequence) and outputs the generated sequence for RS to phase rotation sections 108 in transmission process sections 304-1 and 304-2, each of which is provided for each antenna.

Phase rotation section 108, mapping section 109, IFFT section 110, and CP addition section 111 function as in Embodiment 1 and are included in transmission process section 304. One transmission process section 304 is provided for each antenna.

Transmission power control section 305 determines transmission power for the signals from CP addition sections 304-1 and 304-2 according to the SRS transmission power information for each slot from SRS transmission control section 302, and outputs the signals corresponding to the determined transmission power to RF transmission sections 306-1 and 306-2. Specifically, transmission power control section 305 allocates a predetermined transmission power P to a slot including an SRS to be transmitted and allocates a transmission power of 0 to a slot not including an SRS to be transmitted, where the predetermined transmission power P has been reported in advance from a base station.

Figure 10:
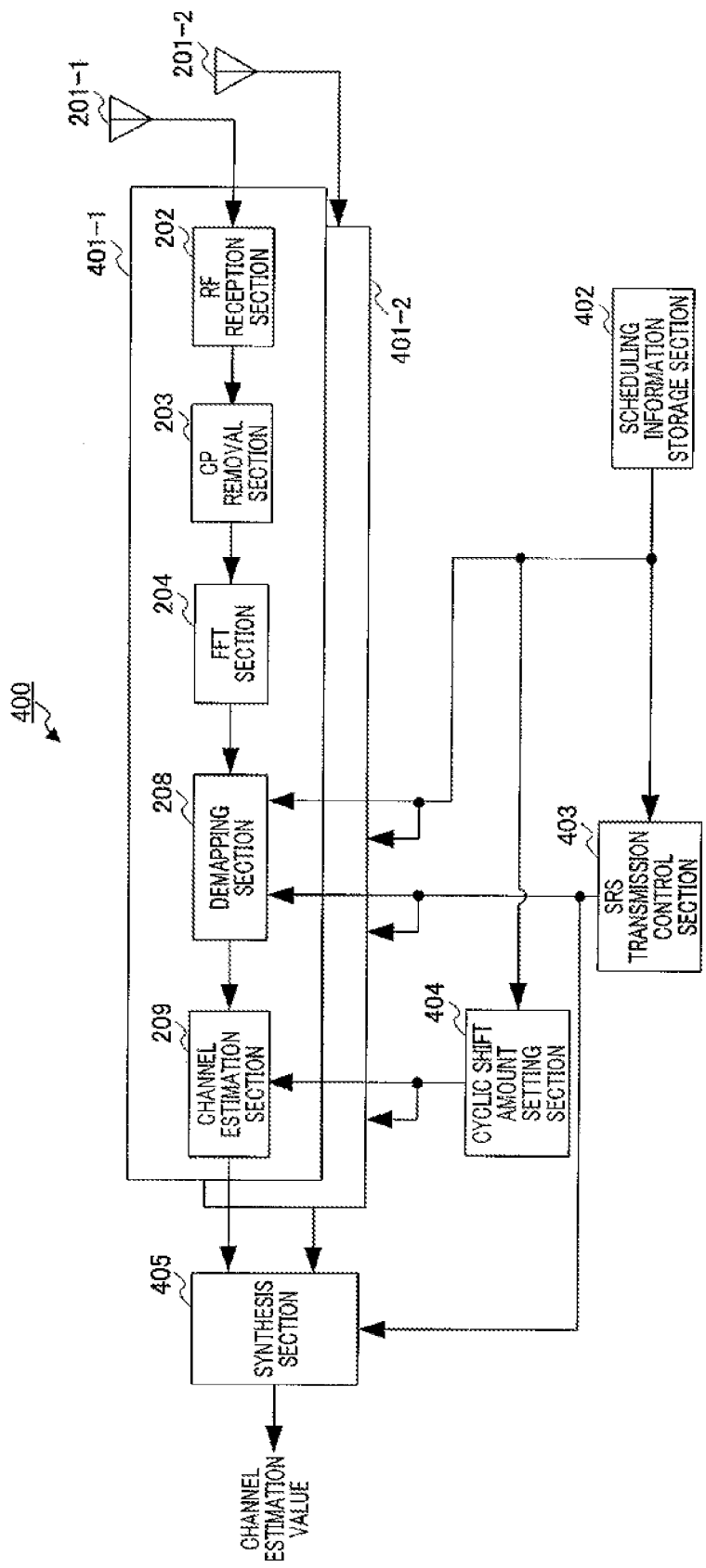
FIG. 10 is a block diagram of a configuration of a base station according to Embodiments 2 and 3 of the present invention.

FIG. 10 is a block diagram of a configuration of base station 400 according to Embodiment 2 of the present invention. The base station in FIG. 10 is different from the base station in FIG. 5 in that one antenna and a reception process for the additional antenna are further provided. Hereinafter, the configuration having different functions from that of Embodiment 1 will be described.

RF reception section 202, CP removal section 203, FFT section 204, demapping section 208, and channel estimation section 209 function as in Embodiment 1 and are included in reception process section 401. One reception process section 401 is provided for each antenna.

Scheduling information storage section 402 stores scheduling information for uplink that has been reported to terminal 300 and outputs the scheduling information received from a desired terminal to demapping sections 208 in reception process sections 401-1 and 401-2, SRS transmission control section 403, and cyclic shift amount setting section 404.

SRS transmission control section 403 acquires a reporting bit sequence that has been transmitted from scheduling formation storage section 402 to a desired terminal and finds an FH flag and SRS transmission power information for each slot (corresponding to the information about SRS transmission slot) for each antenna, the FH flag and SRS transmission power information having been associated in advance with the reporting bit sequence. SRS transmission control section 403 outputs information about the found FH flag to demapping sections 208 in reception process sections 401-1 and 401-2 and outputs the information about the found FH flag and SRS transmission power information to synthesis section 405.

Cyclic shift amount setting section 404 acquires the amount of cyclic shift for the desired terminal for each antenna from reporting information about the CS amount for reference signal that is contained in the scheduling information output from scheduling information storage section 402, and outputs the acquired amount of cyclic shift for each antenna to channel estimation sections 209 in reception process sections 401-1 and 401-2.

Synthesis section 405 combines channel estimation values of slot 1 and slot 2 for each antenna of the desired terminal that are output from channel estimation sections 209 in reception process sections 401-1 and 401-2, based on FH flag information and SRS transmission power information that are output from SRS transmission control section 403. In the case where the FH flag information indicates "without FH", when SRSs are transmitted using slot 1 and slot 2, synthesis section 405 combines the channel estimation values of slot 1 and slot 2 for each antenna. In the case where the FH flag information indicates "with FH," SRS transmission bands that are remote from each other have different channel qualities: hence synthesis section 405 does not combine channel estimation values of slot 1 and slot 2. That is, synthesis section 405 outputs the two channel estimation values (channel estimation values in the two SRS transmission bands of slot 1 and slot 2) as is. Furthermore, in the case where there is a slot not including an SRS to be transmitted for each antenna, synthesis section 405 does not combine channel estimation values of slot 1 and slot 2.

Here, at two transmission antennas, the SRS transmission patterns increase compared to one transmission antenna, accordingly increasing the number of bits required for the reporting bit sequence. At two transmission antennas, there are five patterns of transmission power information in total: that is, four patterns for transmission of one SRS for each antenna (transmission of an SRS using either of slot 1 or slot 2) and one pattern for transmission of SRSs using slot 1 and slot 2. This requires three bits for the reporting bit sequence. In the list of patterns shown below, symbol P denotes transmission of an SRS while "0" denotes non-transmission of an SRS.

Pattern 1:
(slot 1, slot 2)=antenna #1(P, 0), antenna #2(P, 0)
Pattern 2:
(slot 1, slot 2)=antenna #1(0, P), antenna #2(0, P)
Pattern 3:
(slot 1, slot 2)=antenna #1(P, 0), antenna #2(0, P)
Pattern 4: (slot 1, slot 2)=antenna #1(0, P), antenna #2(P, 0)
Pattern 5:
(slot 1, slot 2)=antenna #1(P, P), antenna #2(P, P)

Meanwhile, in the LTE-Advanced system, the total transmission power for all antennas should not exceed the maximum transmission power determined in advance when a terminal transmits a signal concurrently from multiple antennas. For this reason, patterns 1 and 2 involving concurrent signal transmission from multiple antennas has a disadvantage in that maximum transmission power for each antenna is limited, compared to patterns 3 and 4, which may decrease the use of patterns 1 and 2. Hence, when one SRS is transmitted in one subframe per antenna, a terminal uses patterns 3 or 4 instead of patterns 1 and 2.

Regarding pattern 5, as described above, because SRSs can be transmitted using two bands of slot 1 and slot 2 by selecting "with FH," there is an advantage in that the channel quality for a plurality of bands can be measured for each antenna. Furthermore, by selecting "without FH" and equalizing SRSs in an identical band for slot 1 and slot 2 for each antenna, the influence of interference can be advantageously reduced (randomized). For this reason, pattern 5 can be selected for some uses. In pattern 5, the maximum transmission power is suppressed when SRSs are transmitted concurrently from multiple antennas. Setting of pattern 5 at terminals located near the cell center and having remaining transmission power is not affected by the power limitation. Transmission of SRSs concurrently from multiple antennas can appropriately update RANK information (number of spatial multiplexing operations) on a terminal and precoding matrix indicator (PMI) information for spatial multiplexing operation in the MIMO transmission.

An operation of SRS transmission control section 302 of the above-described terminal 300 will now be described. Since SRS transmission control section 403 of base station 400 performs the same operation as SRS transmission control section 302, explanation of SRS transmission control section 403 will not be provided.

SRS transmission control section 302 includes a table in which the FH flag for SRS and SRS transmission power information for each slot are associated with the reporting bit sequence represented by two bits, as shown in FIG. 11. SRS transmission control section 302 acquires from the table FH flag information and SRS transmission power information corresponding to the reporting bit sequence contained in the scheduling information output from scheduling information decoding section 104.

In the case where an SRS is transmitted using only one slot, in the transmission patterns represented by the reporting bit sequences of "01" and "10" in FIG. 11, a terminal transmits one SRS for each antenna by switching antennas for transmitting an SRS between slots. This enables a terminal to transmit one SRS for each antenna without receiving limitation of the maximum transmission power as described above.

By this means, the reporting bit sequence is two bits as in the case where the terminal uses one transmission antenna, reducing the number of bits required for the reporting bit sequence by two bits, compared to the case where an FH flag (one bit) and SRS transmission slot information (three bits) are reported independently.

Furthermore, the number of bits required for the reporting bit sequence does not vary for either one or two transmission antennas. Thus, the same UL grant (control channel) can be used regardless of the number of transmission antennas of the terminal by allowing the terminal to acquire transmission power information from the table based on the number of transmission antennas.

According to Embodiment 2, in the case where a terminal uses two antennas, association of the FH flag for SRS and SRS transmission power information for each slot with the reporting bit sequence represented by two bits can give an instruction on SRS transmission using only one slot for each antenna and dynamically switch the SRS transmission slots for each terminal in a cell without an increase in the number of required signaling bits.

In the case where a terminal uses three or more transmission antennas, SRSs for the antennas cannot be transmitted in one subframe consisting of two slots. In this case, the terminal can transmit SRSs using multiple subframes. For example, for four transmission antennas (antennas #1 to #4), the terminal can transmit SRSs for antennas #1 and #2 using one subframe as described above, and transmit SRSs for antennas #3 and #4 using another subframe as described above.

As shown in FIG. 12, only in the case of transmission of SRSs using slot 1 and slot 2 "without FH," SRS transmission control section 305 can reduce the SRS transmission power by $\Delta P$ (parameter set in advance by a base station to a terminal).

Embodiment 3

Configurations of a terminal and a base station according to Embodiment 3 of the present invention are the same as those of FIGS. 9 and 10 according to Embodiment 2 except for the function of the cyclic shift amount setting section. Hence, the cyclic shift amount setting section will be described with reference to FIGS. 9 and 10. Since the cyclic shift amount setting section of the terminal and the cyclic shift amount setting section of the base station have the same operation, only the cyclic shift amount setting section of the terminal will be described.

Figure 13:
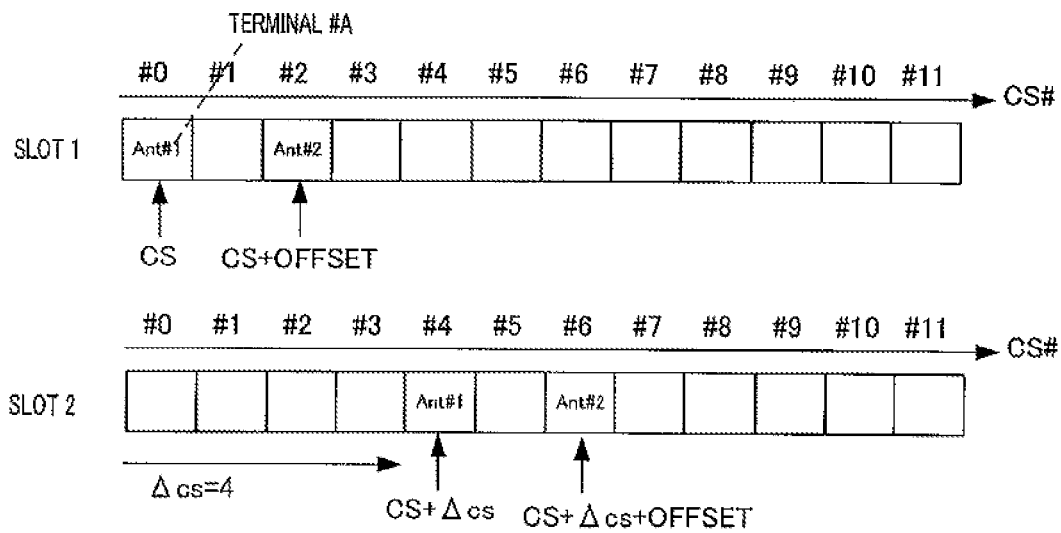
FIG. 13 shows a condition where the amount of cyclic shift is set for each antenna and each slot.

The present embodiment employs a method acquired by simply expanding the method of setting the amount of cyclic shift for LTE. First, the amount of cyclic shift for SRS to be transmitted using slot #M of antenna #N is represented by $CS_{Ant\#N, Slot\#M}$. $CS_{Ant\#N, Slot\#M}$ is set as shown below. Here, the amount of cyclic shift used for slot 2 is the sum of the amount of cyclic shift used for slot 1 and a predetermined offset ($=\Delta_{CS}$). The amount of cyclic shift used for antenna 2 is the sum of the amount of cyclic shift used for antenna 1 and a predetermined offset (=Offset) (sec FIG. 13).

Figure 14:
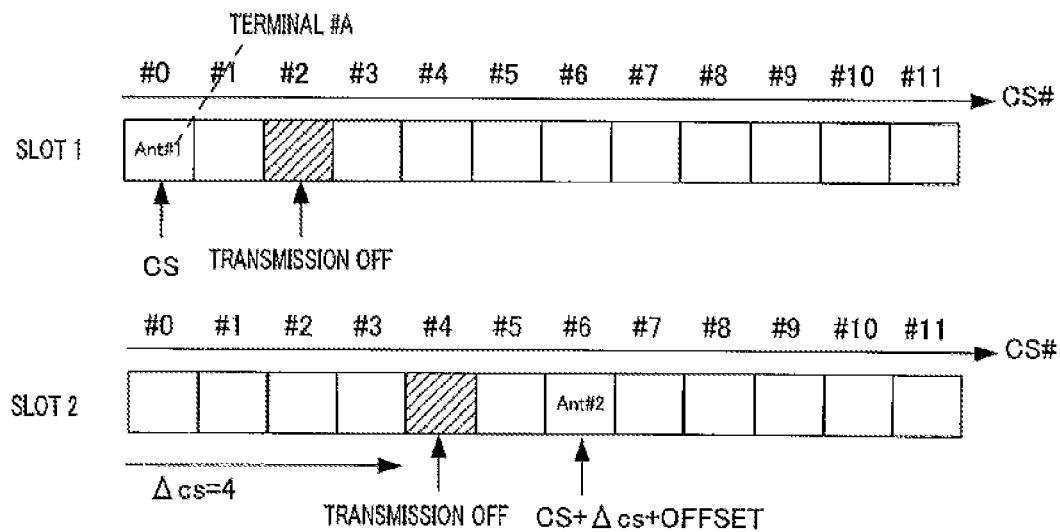
FIG. 14 shows a condition where the amount of cyclic shift is set for each antenna and each slot in the case where one SRS is transmitted in one subframe for each antenna.

$CS_{Ant\#1,Slot\#1}$=Amount of cyclic shift (=CS) to be reported using an UL grant $CS_{Ant\#2,Slot\#1}$=CS+Offset $CS_{Ant\#1,Slot\#2}$=CS+$\Delta_{CS}$ $CS_{Ant\#2,Slot\#2}$=CS+$\Delta_{CS}$+Offset Here, as described in Embodiment 2, the transmission of one SRS in one subframe for each antenna leads to an increase in resource consumption of a cyclic shift sequence, which inadvantegeously decreases the degree of freedom in code multiplexing. For example, terminal A that has received reporting bit sequences of "01" in FIG. 11 uses the amount of cyclic shift shown below (see FIG. 14).

Figure 15:
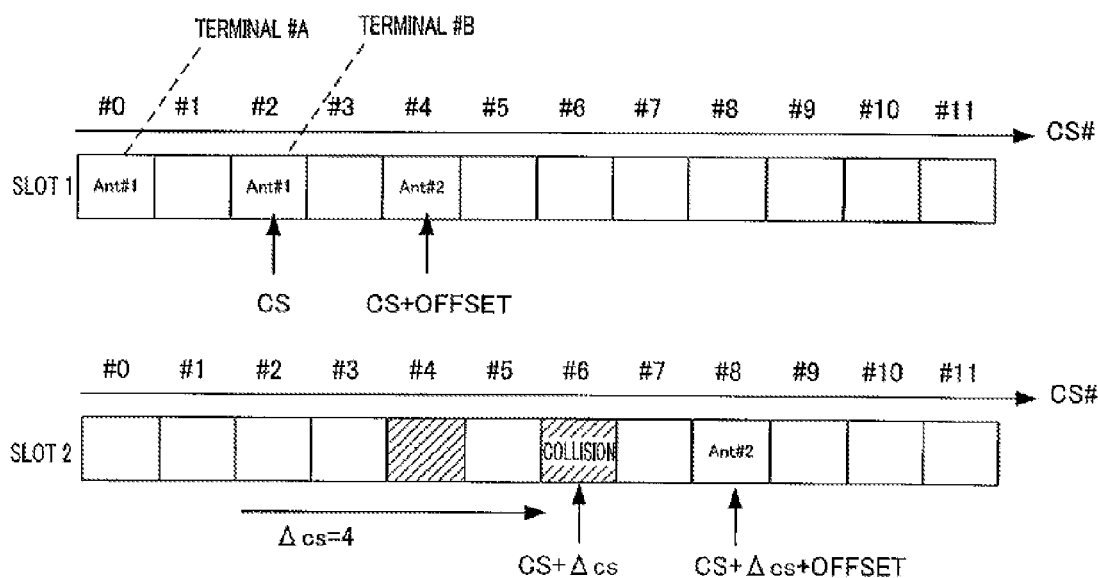
FIG. 15 shows a condition where the amount of cyclic shift is set to a plurality of terminals based on a conventional method of setting the amount of cyclic shift.

$CS_{Ant\#1,Slot\#1}$=CS $CS_{Ant\#2,Slot\#1}$=NO transmission $CS_{Ant\#1,Slot\#2}$=CS+$\Delta_{SC+}$Offset $CS_{Ant\#2,Slot\#2}$=CS+$\Delta_{CS}$+Offset In this case, the base station cannot set the amount of cyclic shift CS+$\Delta_{CS}$ used for terminal A to other terminal B by transmitting an UL grant, for the following reason. Setting of the amount of cyclic shift CS+$\Delta_{CS}$ used for terminal A to terminal B that is trying to transmit SRSs using slot 1 and slot 2 leads to collision of slot 2 of terminal B with the amount of cyclic shift of terminal A because terminal B uses the amount of cyclic shift CS+$\Delta_{CS}$+Offset used for terminal A in slot 2 (see FIG. 15).

Figure 16:
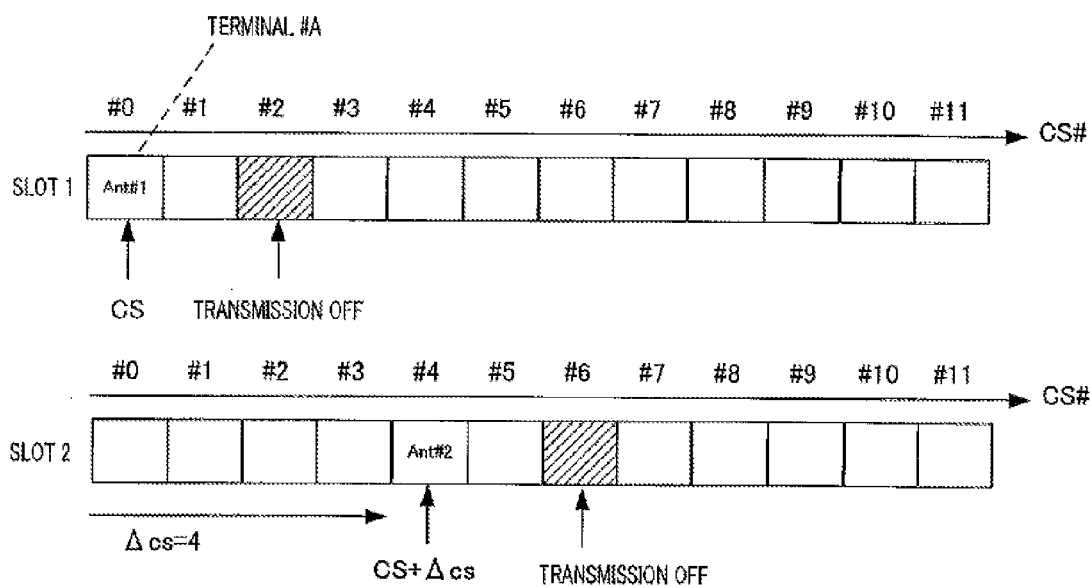
FIG. 16 shows a method of setting the amount of cyclic shift according to Embodiment 3 of the present invention.

In order to overcome this problem, the cyclic shift amount setting section according to Embodiment 3 exchanges the amount of cyclic shift for SRS between antennas for exchange of antennas to be used for SRS transmission between slots. That is, the cyclic shift amount setting section uses the amount of cyclic shift shown below (see FIG. 16).

$CS_{Ant\#1,Slot\#1}$=CS $CS_{Ant\#2,Slot\#1}$=No transmission $CS_{Ant\#1,Slot\#2}$=No transmission $CS_{Ant\#2,Slot\#2} \rightarrow CS_{Ant\#1,Slot\#2}=CS+\Delta_{CS}$ Likewise, the terminal that has received the instruction on the reporting bit sequence of "10" in FIG. 11 uses the amount of cyclic shift shown below.

Figure 17:
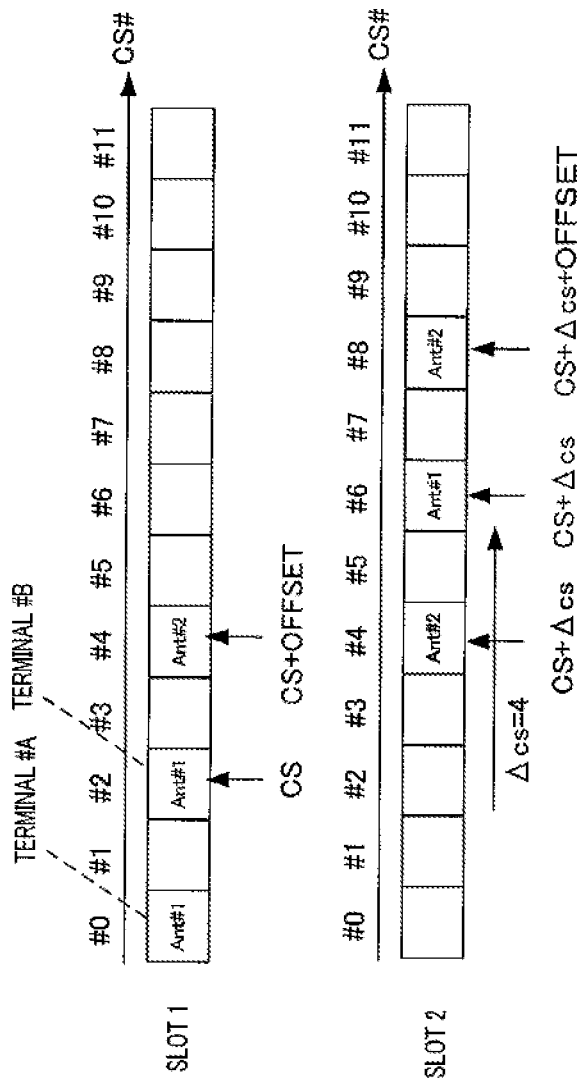
FIG. 17 shows a condition where the amount of cyclic shift is set to a plurality of terminals based on a method of setting the amount of cyclic shift according to Embodiment 3 of the present invention.

$CS_{Ant\#1,Slot\#1}$=No transmission $CS_{Ant\#2,Slot\#1}$=CS+Offset $CS_{Ant\#1,Slot\#2} \rightarrow CS_{Ant\#2,Slot\#2}=CS+\Delta_{CS}+$Offset $CS_{Ant\#2,Slot\#2}$=No transmission By this means, as shown in FIG. 17, other terminals can use the amount of cyclic shift used for an antenna not transmitting an SRS. Thus, the resource for cyclic shift sequence can be efficiently used and signals can be flexibly multiplexed for a plurality of terminals.

In this way, according to Embodiment 3, in the case where the terminal transmits an SRS using either slot 1 or slot 2 through two transmission antennas using different slots between antennas, the amounts of cyclic shift for SRS are exchanged between the antennas. This enables the other terminals to use the amount of cyclic shift to be used for an antenna not transmitting an SRS, resulting in efficient use of a resource for cyclic shift sequence and flexible multiplexing for a plurality of terminals.

The scheduled SRS in the above embodiments refers to a reference signal without data for which transmission is prompted by an UL grant (reporting of scheduling information for uplink). The scheduled SRS is not limited to this name and other names can also be used: "aperiodic SRS," "dynamic aperiodic sounding," or "sounding via DMRS" may be used, for example.

Also, although cases have been described with the above embodiment as examples where the present invention is configured by hardware, the present invention can also be realized by software.

Each function block employed in the description of each of the aforementioned embodiments may typically be implemented as an LSI constituted by an integrated circuit. These may be individual chips or partially or totally contained on a single chip. "LSI" is adopted here but this may also be referred to as "IC," "system LSI," "super LSI," or "ultra LSI" depending on differing extents of integration.

Further, the method of circuit integration is not limited to LSI's, and implementation using dedicated circuitry or general purpose processors is also possible. After LSI manufacture, utilization of a programmable FPGA (Field Programmable Gate Array) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

Although a case has been described with the above embodiment where the present invention is configured as an antenna, the present invention is also applicable to an antenna port.

The term, antenna port, refers to a theoretical antenna configured with one or a plurality of physical antennas. That is, an antenna port does not always refer to one physical antenna, and can also refer to, for example, an array antenna configured with a plurality of antennas.

For example, in 3GPP LTE, how many physical antennas an antenna port is configured with is not prescribed, and an antenna port is prescribed as a minimum unit by which a base station can transmit a different reference signal.

Further, an antenna port is also prescribed as a minimum unit with which the weight of precoding vector is multiplied.

The disclosure of Japanese Patent Application No. 2010-027958, filed on Feb. 10, 2010, including the specification, drawings and abstract, is incorporated herein by reference in its entirety.

INDUSTRIAL APPLICABILITY

A radio communication terminal apparatus, a radio communication base station apparatus, and a radio communication method according to the present invention are applicable to mobile communication systems such as LTE-Advanced.

REFERENCE SIGNS LIST

101, 201 antenna
102, 202 RF reception section
103 demodulation section
104 scheduling information decoding section
105, 207, 301, 404 cyclic shift amount setting section
106, 206, 302, 403 SRS transmission control section
107, 303 RS generation section
108 phase rotation section
109 mapping section
110 IFFT section
111 CP addition section
112, 305 transmission power control section
113, 306-1, 306-2 RF transmission section
203 CP removal section
204 FFT section
205, 402 scheduling information storage section
208 demapping section
209 channel estimation section
210, 405 synthesis section
304-1, 304-2 transmission process section
401-1, 401-2 reception process section

The invention claimed is:

1. A terminal apparatus comprising:
a receiver configured to receive reporting information having a first bit associated with first transmission slot information and a second bit associated with second transmission slot information, the first transmission slot information indicating transmission of a sounding reference signal using a first slot in a single subframe, and the second transmission slot information indicating transmission of the sounding reference signal using a second slot in the single subframe, wherein when the first bit and the second bit have the same state, the state indicates whether or not a frequency hopping flag is present;
a mapper configured to map the sounding reference signal based on the first transmission slot information, the second transmission slot information, and a presence of the frequency hopping flag; and
a transmitter configured to transmit the mapped sounding reference signal,
wherein, when the first bit and the second bit have different states, the mapper is configured to map the sounding reference signal in only one of the first slot and the second slot based on the first transmission slot information and the second transmission slot information, wherein, when the first bit and the second bit have the same state, the mapper is configured to map the sounding reference signal in both the first slot and the second slot and, if the frequency hopping flag is present, the mapper is configured to map the sounding reference signal in a frequency band of the first slot indicated by the first transmission slot information and in a frequency band determined by adding the amount of frequency resource hopping to a frequency band of the second slot indicated in frequency resource assignment information, and wherein the amount of frequency resource hopping is defined in advance.

2. The terminal apparatus according to claim 1, further comprising a transmission power controller configured to reduce transmission power of the mapped sounding reference signal by a predetermined value, when the sounding reference signal is transmitted using all slots in the single subframe without the frequency hopping.

3. The terminal apparatus according to claim 2, wherein the predetermined value is set low if a channel variation rate is high, and is set high if the channel variation rate is low.

4. A base station apparatus comprising:

a receiver configured to receive reporting information having a first bit associated with first transmission slot information and a second bit associated with second transmission slot information, the first transmission slot information indicating transmission of a sounding reference signal using a first slot in a single subframe, and the second transmission slot information indicating transmission of the sounding reference signal using a second slot in the single subframe, wherein when the first bit and the second bit have the same state, the state indicates whether or not a frequency hopping flag is present;

a mapper configured to map the sounding reference signal based on the first transmission slot information, the second transmission slot information, and a presence of the frequency hopping flag; and a transmitter configured to transmit the mapped sounding reference signal, wherein, when the first bit and the second bit have different states, the mapper is configured to map the sounding reference signal in only one of the first slot and the second slot based on the first transmission slot information and the second transmission slot information, wherein, when the first bit and the second bit have the same state, the mapper is configured to map the sounding reference signal in both the first slot and the second slot and, if the frequency hopping flag is present, the mapper is configured to map the sounding reference signal in a frequency band of the first slot indicated by the first transmission slot information and in a frequency band determined by adding the amount of frequency resource hopping to a frequency band of the second slot indicated in frequency resource assignment information, and wherein the amount of frequency resource hopping is defined in advance.

5. A radio communication method performed by a terminal apparatus, comprising:

receiving, from a base station apparatus, reporting information having a first bit associated with first transmission slot information and a second bit associated with second transmission slot information, the first transmission slot information indicating transmission of a sounding reference signal using a first slot in a single subframe, and the second transmission slot information indicating transmission of the sounding reference signal using a second slot in the single subframe, wherein when the first bit and the second bit have the same state, the state indicates whether or not a frequency hopping flag is present;

when the first bit and the second bit have different states, mapping the sounding reference signal in only one of the first slot and the second slot based on the first transmission slot information and the second transmission slot information, and when the first bit and the second bit have the same state, mapping the sounding reference signal in both the first slot and the second slot and, if the frequency hopping flag is present, mapping the sounding reference signal in a frequency band of the first slot indicated by the first transmission slot information and in a frequency band determined by adding the amount of frequency resource hopping to a frequency band of the second slot indicated in frequency resource assignment information, and transmitting, to the base station apparatus, the sounding reference signal based on the frequency hopping flag and the first transmission slot information; and mapping the sounding reference signal based on the second transmission slot information in a case where the second reporting information is received, wherein the amount of frequency resource hopping is defined in advance.

6. A radio communication method performed by a base station apparatus, comprising:

receiving, from a terminal apparatus, reporting information having a first bit associated with first transmission slot information and a second bit associated with second transmission slot information, the first transmission slot information indicating transmission of a sounding reference signal using a first slot in a single subframe, and the second transmission slot information indicating transmission of the sounding reference signal using a second slot in the single subframe, wherein when the first bit and the second bit have the same state, the state indicates whether or not a frequency hopping flag is present;

when the first bit and the second bit have different states, mapping the sounding reference signal in only one of the first slot and the second slot based on the first transmission slot information and the second transmission slot information, and when the first bit and the second bit have the same state, mapping the sounding reference signal in both the first slot and the second slot and, if the frequency hopping flag is present, mapping the sounding reference signal in a frequency band of the first slot indicated by the first transmission slot information and in a frequency band determined by adding the amount of frequency resource hopping to a frequency band of the second slot indicated in frequency resource assignment information, and transmitting, to the terminal apparatus, the sounding reference signal based on the frequency hopping flag and the first transmission slot information; and mapping the sounding reference signal based on the second transmission slot information in a case where the second reporting information is received,
wherein the amount of frequency resource hopping is defined in advance.

* * * * *